March 24, 1953

J. A. ANDERSON 2,632,290

PEANUT HARVESTING MACHINE

Filed Sept. 22, 1950

INVENTOR.
JAMES A. ANDERSON
BY
Jennings & Carter
ATTORNEYS

March 24, 1953 J. A. ANDERSON 2,632,290
PEANUT HARVESTING MACHINE
Filed Sept. 22, 1950 4 Sheets-Sheet 3

INVENTOR.
JAMES A. ANDERSON
BY
Jennings V Carter
ATTORNEYS

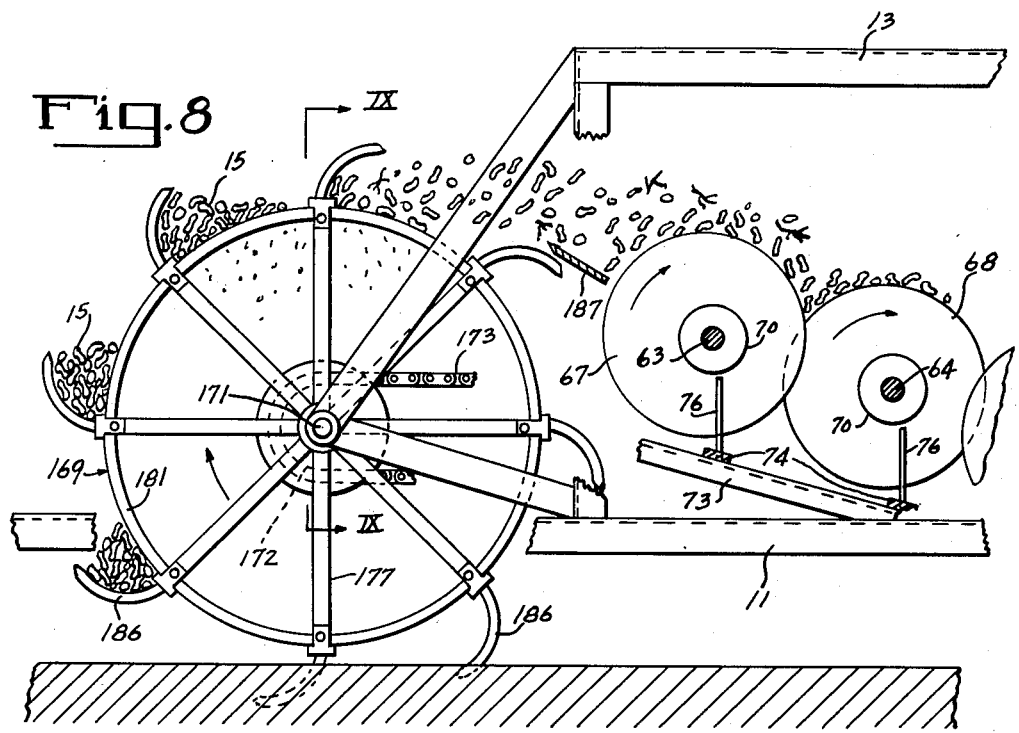

Patented Mar. 24, 1953

2,632,290

UNITED STATES PATENT OFFICE 2,632,290

PEANUT HARVESTING MACHINE

James A. Anderson, Hartford, Ala.

Application September 22, 1950, Serial No. 186,153

2 Claims. (Cl. 55—51)

This invention relates to apparatus for harvesting peanuts and has for its principal object the provision of such apparatus whereby the peanuts are harvested after the vines have been removed.

A further object of my invention is to provide apparatus for harvesting peanuts whereby the labor required is greatly reduced.

A further object is to provide apparatus for harvesting peanuts whereby the peanuts may be harvested at the convenience of the farmer rather than at a particular time, thus affording more time for the peanuts to mature, increasing the yield, eliminating the problems of a pressed market for the peanuts, and reducing the labor required for gathering and marketing the peanuts.

A still further object of my invention is to provide apparatus for harvesting peanuts including means for scooping up the top surface of the ground containing the peanuts and means to separate the soil, trash and stones from the peanuts. Heretofore, it has been the universal custom to harvest peanuts by pulling up the vines with the peanuts hanging to the roots and stacking the vines with the roots outward to dry, the nuts were then removed from the roots by a picker and cleaned of dirt and graded. This method necessarily involves the discarding of a large quantity of immature peanuts. If the vines are allowed to remain in the field until all the peanuts are mature, then the stems between the vines and the earlier peanuts rot and when the vines are pulled up, these peanuts are left in the ground. With my improved apparatus the peanuts are not harvested with the vines. The vines are allowed to remain in the field until all the peanuts have matured. The vines are then removed, without removing the peanuts and the mature peanuts are then dug from the ground, cleaned and sacked in one operation. By this means the yield is increased as much as 40%, the grade of peanuts is improved, and the labor of harvesting greatly reduced. Furthermore the peanuts may be harvested at a time convenient to the farmer and not necessarily at a particular time, as with prior methods and apparatus.

In operation, my improved apparatus scoops up the top soil which contains the peanuts. The peanuts, soil, trash, rocks and the like are then conveyed upwardly by a conveyor over a screen comprised of a plurality of longitudinally extending rods spaced apart to allow the soil to fall therethrough, but close enough to prevent peanuts from passing through. The peanuts, trash, rocks and the remaining soil next fall onto a screen comprised of a multiplicity of closely spaced rotary discs mounted on a shaft where the soil is further separated from the peanuts. They then pass to a shaking screen having openings at the forward portion thereof which permit the remaining soil to fall therethrough but retain the peanuts and openings at the rear thereof which are of a size to permit the peanuts to pass through and retain the trash. The stones are then separated from the peanuts by passing the peanuts through a stone separator. The peanuts are then bagged in the usual manner.

Apparatus embodying the features of my invention is illustrated in the accompanying drawings forming a part of this application in which:

Fig. 6 is a fragmentary sectional view taken along line VI—VI of Fig. 2;

Fig. 7 is an elevational view of the stone separator partly broken away and in section;

Fig. 8 shows a modified form of my invention whereby a combined rotary digger and screen is employed; and, Fig. 9 is a sectional view taken along line IX—IX of Fig. 8.

Figure 1:
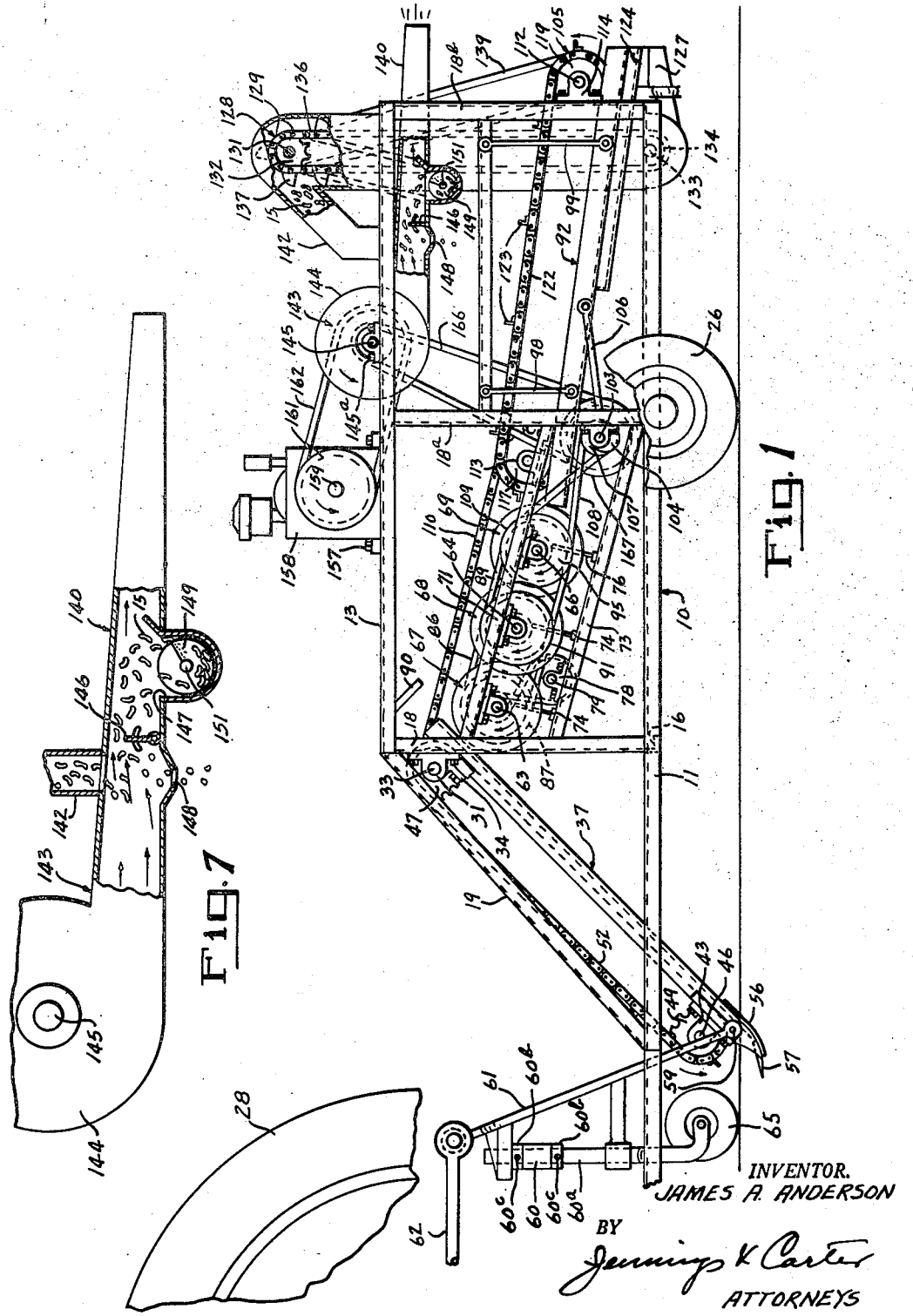
Fig. 1 is an elevational view of the peanut harvester.
Figure 2:
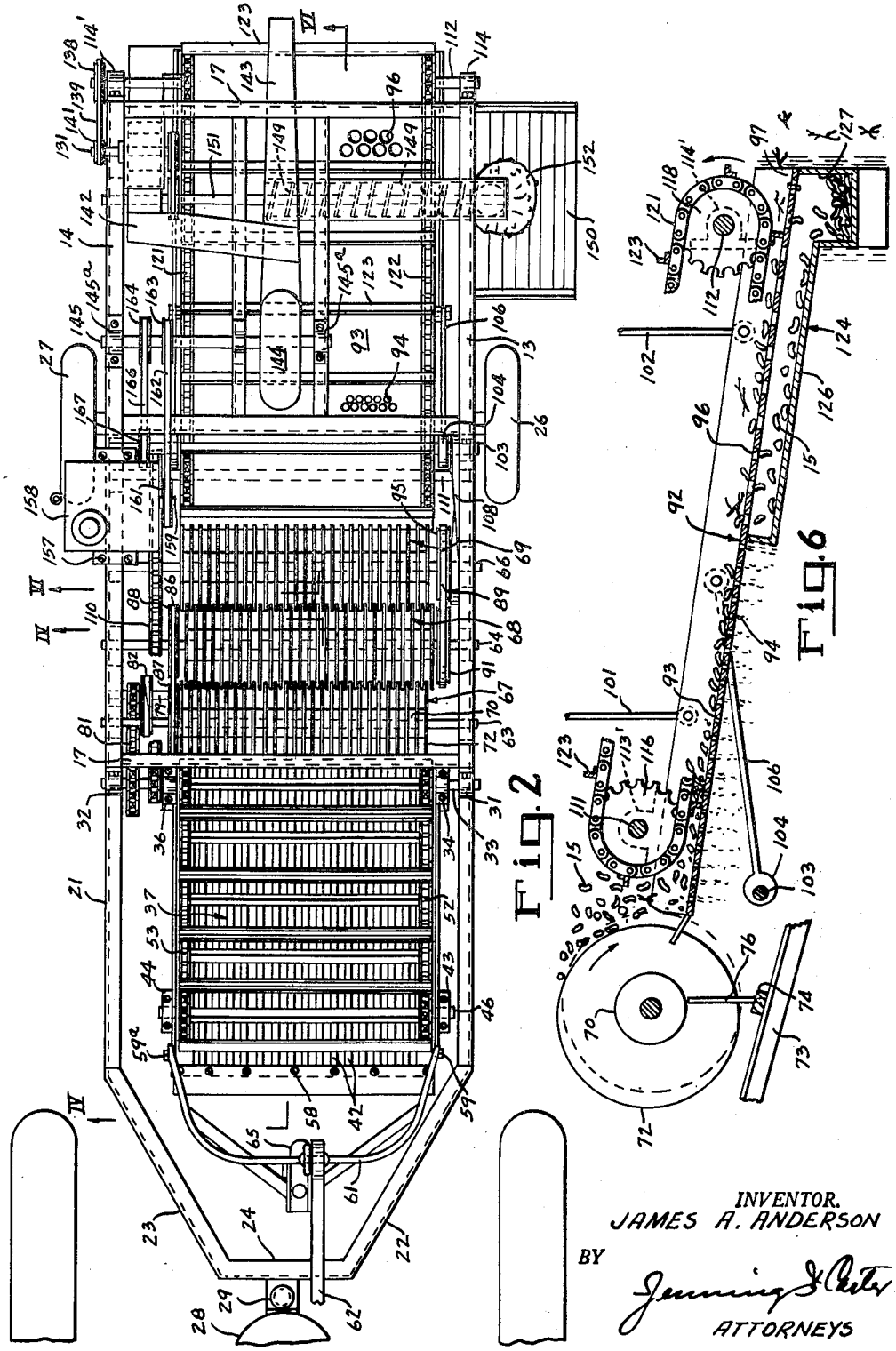
Fig. 2 is a plan view thereof.
Figure 3:
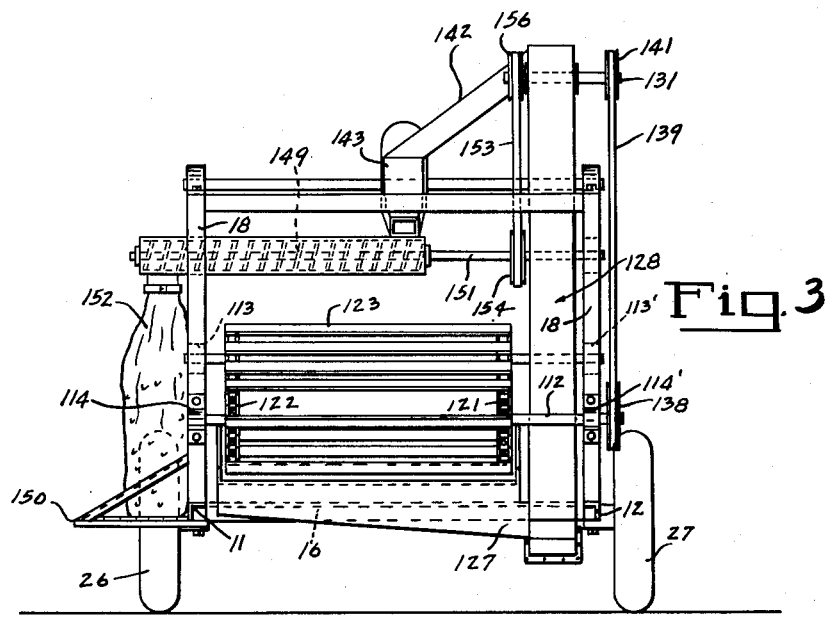
Fig. 3 is an end view thereof.
Figure 5:
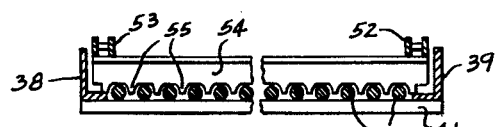
Fig. 5 is a sectional view taken along the line V—V of Fig. 4.
Figure 4:
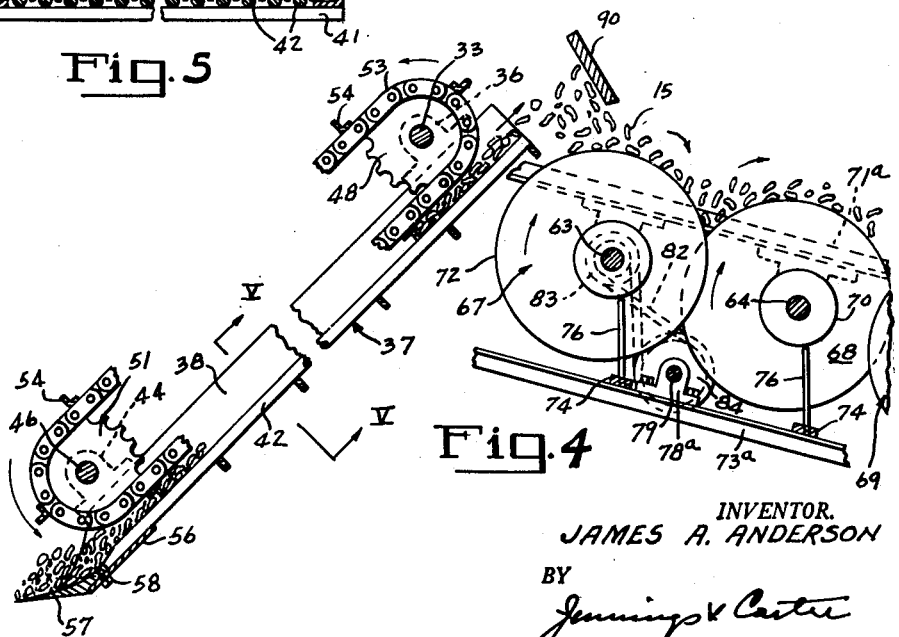
Fig. 4 is a sectional view taken along the line IV—IV of Fig. 2.

Referring now to the drawings for a better understanding of my invention I show in Fig. 1 a frame 10 having lower side members 11 and 12, upper side members 13 and 14, lower cross members 16, upper cross members 17, vertical frame members 18, 18a and 18b, and inclined frame members 19 and 21 at the forward end of the frame. At the forward end of the lower side members 11 and 12 are inwardly and forwardly extending frame members 22 and 23 joined together at the forward end thereof by a lateral cross pieces 24. The frame is mounted on wheels 26 and 27 and is attached to a tractor 28 as at 29.

Mounted adjacent the upper forward side of the forwardmost vertical member 18 are bearings 31 and 32. Rotatably mounted in the bearings 31 and 32 is a shaft 33. Pivotally mounted on the shaft 33 in bearings 34 and 36 is an inclined conveyor 37 comprising a pair of angle irons 38 and 39 having laterally extending cross bars 41 therebetween and secured to the under side of the angle irons. Preferably, the cross bars 41 should be approximately 12 inches apart. Mounted on top of and supported by the cross bars 41 are a plurality of rods 42 which are parallel to the angle irons 38 and 39. The rods are spaced apart a sufficient distance to allow sand to fall therethrough and to prevent the peanuts, as shown at 15, from falling therethrough. In practice I have found that, for runner peanuts, rods approximately $\frac{5}{16}$ of an inch in diameter and approximately $\frac{7}{16}$ of an inch apart are satisfactory.

Mounted at the lower end of the elevator in suitable bearings 43 and 44 is a shaft 46. Mounted on the shaft 33 are sprockets 47 and 48 and mounted on the shaft 46 are sprockets 49 and 51. The sprockets 47 and 49 are rotatably connected by an endless sprocket chain 52 and the sprockets 48 and 51 are rotatably connected by an endless sprocket chain 53. Secured to the sprocket chain 52 and 53 at intervals are laterally extending angle iron drags 54. The sprockets 48 and 47 rotate in a counterclockwise direction as viewed in Fig. 1 and as they rotate the drags 54 slidably contact the upper surface of the rods 42. To assure that the spaces between the rods 42 are always kept free from obstructions, fingers 55, which extend downwardly between the rods 42, may be provided at the bottom of the drags 54.

Secured to the lower end of the elevator 37 is a plate 56 and detachably secured to the plate 56 is a scoop 57. The scoop 57 may be secured to the plate 56 by any suitable means such as bolts 58. The rods 42 are curved at the lower ends thereof so that the upper surface of the rods rests level with the face of the scoop 57. Secured to the lower sides of the elevator as at 59 and 59a is a U-shaped lifting member 61. The U-shaped lifting member is operatively connected to the hydraulic lift 62 of the tractor and is operated in a manner well understood.

Secured to the lifting member 61 in any suitable manner is a bearing 60. Pivotally mounted in the bearing 60 is a forked member 60a which may be adjustably held in place by means of collars 60b having setscrews 60c. Rotatably mounted in the lower end of the forked member 60a is a wheel 65. The pivot wheel 65 supports the forward end of the conveyor 37 and also causes the scoop to follow the contour of the soil.

Rotatably mounted on the frame in a position to receive the peanuts and materials to be separated therefrom from the elevator 37 are three rotary disc screens 67, 68 and 69 mounted on shafts 63, 64 and 66 respectively. While I show three disc screens, it will be apparent that any number of such disc screens may be employed. The shafts are rotatably mounted in suitable bearings on supporting members 71 and 71a. The supporting members 71 and 71a may be sloped rearwardly at an angle from the horizontal, the angle of slope depending upon the speed at which the disc screens rotate. Each disc screen is made up of a plurality of individual thin metal discs 72 of suitable diameter and approximately ⅜ of an inch apart. The individual discs are separated by means of circular spacers 70 which are mounted on the shafts 63, 64 and 66 between the discs 72. Mounted on a second pair of supporting members 73 and 73a parallel to the supporting members 71 and 71a are cross rods 74 and mounted on the cross rods 74 are a plurality of fingers 76. The fingers 76 extend between the individual discs 72 to a point adjacent the outer surface of the spacers 70 and prevent rocks, trash and the like from being lodged therebetween. The discs 72 are preferably mounted off center on their respective shafts so as to increase the shaking action and further separate soil from the peanuts. The individual discs 72 of the disc screens 68 overlap the individual discs of the disc screens 67 and 69 as shown.

Mounted on the lower supporting members 73 and 73a in suitable bearings 78 and 78a is a countershaft 79. The countershaft 79 is operatively connected to the shaft 33 by means of a sprocket chain 81 which passes over suitable sprockets mounted on the shafts 79 and 33. The shaft 63, on which disc screen 67 is mounted, is rotatably connected to the countershaft 79 by means of a twisted belt 82 which passes over a pulley 83 on shaft 63 and a pulley 84 on the countershaft 79. The disc screen 67 is operatively connected to the disc screen 68 by means of a belt 86 passing over a pulley 87 on the shaft 63 and a pulley 88 on the shaft 64. Disc screen 68 is operably connected to the disc screen 69 by means of a belt 89 passing over a pulley 91 on the shaft 64 and a pulley 95 on the shaft 66. To assure that all the peanuts strike the disc 67 before passing to the other discs, I provide a baffle 90 which is secured to the upper frame members 13 and 14.

Mounted on the frame 10 adjacent the discharge end of the disc 69 is a rearwardly sloping shaker screen 92 embodying a plate 93 having openings 94 in the forward half thereof of a size to permit sand to fall therethrough and to prevent the peanuts from falling therethrough. The rear half of the plate 93 is provided with openings 96 of a size to permit the peanuts to fall through and to retain any trash, large clods, rocks or the like thereon. The trash passes over the ends of the plate 93 at 97.

The shaking screen is pivotally supported from the frame 10 by means of vertically extending arms 98, 99, 101 and 102. Mounted on the lower forward side of the vertical frame members 18a in suitable bearings is a shaft 103. Mounted on the shaft 103 is an eccentric 104 for shaking the screen 92 and is connected to the screen 92 by means of a rod 106. Also mounted on the shaft 103 adjacent the eccentric 104 is a pulley 107. The shaft 103 is operably connected to the shaft 66 by means of a twisted belt 108 which passes over a pulley 107, and a pulley 109 on shaft 66.

Mounted above the shaker screen 92 is a conveyor 105 comprising a shaft 111 rotatably mounted in bearings 113 and 113' and a shaft 112 rotatably mounted in bearings 114 and 114'. Mounted adjacent the opposite ends of the shaft 111 are sprockets 116 and 117 and mounted adjacent opposite ends of the shaft 112 are sprockets 118 and 119. Passing over the sprockets 116 and 118 is an endless sprocket chain 121 and passing over the sprockets 117 and 119 is an endless sprocket chain 122. Secured at intervals to the sprocket chains 121 and 122 are laterally extending angle iron drags 123. The angle iron drags 123 slidably contact the upper surface of the plates 93 thus moving the peanuts and material to be separated therefrom across the plate. The shaft 111 is rotatably connected to the shaft 33 by means of an endless sprocket chain 110 which passes over suitable sprockets on the shafts 111 and 33.

Mounted beneath the rear half of the plate 93 is a closed receptacle 124 having a bottom wall 126 parallel to and spaced from the plate 93. The lower end of the container 124 is in the form of a laterally sloping passage 127 which is substantially rectangular in cross section.

Communicating with the lower end of the passage 127 is an elevator 128 embodying a closed conveyor housing 129 and has mounted adjacent the upper end thereof a shaft 131 having a sprocket 132 mounted thereon. Mounted at the lower end of the conveyor housing on a shaft 133 is a sprocket 134. Passing over the sprockets 132 and 134 is a conveyor chain 136 having buckets 137 mounted thereon. To drive the sprocket chain 136 a pulley 138 is mounted at one end of the shaft 112 and mounted at one end of the shaft 131 opposite the pulley 138 and rotatably connected thereto by means of a belt 139 is a pulley 141.

The elevator 128 discharges the peanuts, stones and the like into a chute 142 which communicates with a stone separator 143 comprising a tubular conduit 140 having an air blower 144 at one end thereof and an opening at the other end thereof. The blower is mounted on a shaft 145 mounted in bearings 145a. Pivotally mounted at the bottom of the conduit 140 is an adjustable baffle 146. The baffle is adjusted to a point where peanuts are lifted over the baffle by the air current and the stones fall down in front of the baffle and out through an opening 148. The chute 142 communicates with the conduit 140 intermediate the blower and the baffle 146. In operation the blower 144 blows the peanuts over the baffle 146 into an outlet 147, while the stones fall through the outlet 148 which is below the point where the chute 142 communicates with the conduit 140. The outlet 147 communicates with a screw conveyor 149 mounted on a shaft 151 which is rotatably mounted in suitable bearings. The screw conveyor conveys the peanuts to the opposite side of the frame 10 where the peanuts are discharged into a bag 152 resting on a platform 150. The shaft 151 is rotatably connected to the shaft 131 by means of a belt 153 passing over a pulley 154 on the shaft 151 and a pulley 156 on the shaft 131.

Mounted on top of the frame member 14 by bolts 157 is a power unit, such as an internal combustion engine 158, for driving the moving parts of the harvester. I prefer to use a separate power unit on the harvester rather than a power take-off from the tractor since it is very important to have an uninterrupted or uniform power supply. The engine 158 has a shaft 159 and mounted on the shaft 159 is a pulley 161. The pulley 161 is rotatably connected to the shaft 145 by means of a belt 162 passing over a pulley 163 on the shaft 145. Also mounted on the shaft 145 is a pulley 164 which is rotatably connected to the shaft 103 by means of a belt 166 which passes over a pulley 167 mounted on the shaft 103. The shaft 103 and shaft 145 rotate in a counter-clockwise direction as viewed in Fig. 1 while the shafts 63, 64 and 66 rotate in a clockwise direction. The conveyor 37, conveyor 105, elevator 128 and screw conveyor 149 all rotate in a counter-clockwise direction, as viewed in Fig. 1.

From the foregoing the operation of my improved peanut harvester will now be readily understood. The peanut vines are first removed and the surface of the ground broken up by any suitable means. As the harvester is moved forward by the tractor 28 the conveyor 37 is lowered by means of the hydraulic lift 62 so that the scoop 57 scoops up approximately 3 inches of the top soil containing the peanuts. The soil containing the peanut is then conveyed upwardly over the longitudinally extending rods 42 by means of the angle iron drags 54 thus causing a considerable amount of sand to fall downwardly between the rods 42. By providing a plurality of longitudinally extending rods, the peanuts slide along the upper surface of the rods without any danger of them being damaged. From the elevator 37 the peanuts fall onto the disc screens 67, 68 and 69 thus further removing sand from the peanuts. The baffle 90 prevents the peanuts and soil from being thrown over the first disc 67 thus assuring that all the peanuts and materials to be separated therefrom strike all three discs. As the discs rotate the fingers 76 extending between the individual discs keep the space therebetween clear of all trash, rocks and the like. The peanuts, trash, rocks and the like pass from the disc screen 69 onto the shaker screen 92 where the remaining sand falls through the openings 94 as the conveyor 105 moves the peanuts and materials to be separated therefrom across the plate 93. The peanuts and small stones then pass through the opening 96 into the container 124 thence through the sloping passage 127. While the trash and larger stones pass off the end of the plate 93 as at 97. From the passage 127 the peanuts and stones pass to the elevator 128 and are conveyed upwardly by means of the buckets 137 and are discharged into the chute 142. The peanuts and stones then pass through the stone separator 143 where the stones fall through the opening 148 and the peanuts are blown over baffle 146 into the opening 147. The peanuts then pass through the screw conveyor 149 to the bags 152 where they are bagged in the usual manner.

In Figs. 8 and 9 I show a modified form of my invention in which a rotary digger 169 is employed instead of the scoop 57 and the conveyor 37. The rotary digger is mounted on a shaft 171 which is rotatably mounted in suitable bearings on the sloping frame members 19 and 21. Mounted at one end of the shaft 171 is a sprocket 172 which is driven by a chain 173 which passes over the sprocket 172 and a suitable sprocket on the shaft 111.

The rotary digger comprises a spider 174 secured to a suitable bearing 176 at one side of the digger and a similar spider 177 secured to a bearing 178 at the opposite side of the digger. Secured to the inner side of each of the spiders 174 and 177 and inwardly of the ends thereof are lateral cross bars 179. Extending around and contacting the outer surfaces of the bars 179 are rods 181 spaced apart a sufficient distance to allow sand to fall therethrough and to prevent the peanuts from falling therethrough. The rods 181 are held in place by means of laterally extending bars 182 having downturned ends 183 and 184, which fit snugly against the outer sides of the spiders 174 and 177. Secured to the bars 182 and extending outwardly therefrom are curved fingers 186 which scoop up the soil containing the peanuts and discharge the same onto the rotary disc screen 67. A baffle 187 is provided between the digger 169 and the disc to prevent the peanuts from falling therebetween. Secured to the inner sides of the spiders 174 and 177 adjacent the bearings 176 and 178 respectively is a double conical plate 188 which slopes upwardly toward the center thereof as at 189. This plate provides a sloping surface to deflect the sand, which falls downwardly between the rods 181, between the arms 174 and 177 outwardly of the rotary digger.

From the foregoing it will be seen that I have devised a peanut harvester which gathers substantially all of the peanuts and one which may be adapted for harvesting peanuts after the vines have been removed, and which may be employed to harvest peanuts at the convenience of the farmer.

While I have shown my invention in but two forms it will be obvious to those skilled in the art that it is not so limited and I desire, therefore, that only such limitations shall be imposed thereupon as are specifically set forth in the appended claims.

What I claim is:

1. In apparatus for harvesting sub-surface crops such as peanuts and the like after the vines have been removed and separating the same from loose dirt and adhering soil, a translatably supported frame, a forwardly inclined conveyor trough pivotally mounted at its upper end to said frame and comprising a bottom in the form of longitudinally extending rods substantially the length of the trough spaced a sufficient distance apart to permit loose soil and the like to pass therebetween and close enough to prevent peanuts from passing therebetween, means to move the peanuts and soil up the trough parallel to the longitudinal axes of said rods, a scoop at the lower end of said conveyor trough in position to scoop up soil containing the peanuts as the apparatus moves along and place the same in said conveyor trough, means to regulate the working depth of said scoop, laterally extending shafts rotatably mounted on said frame with the forwardmost shaft positioned adjacent the discharge end of said trough conveyor, means to rotate said shafts, and a plurality of spaced apart circular discs mounted on said shafts, said discs being spaced apart a distance to permit the soil removed from the peanuts by said discs to pass therebetween and close enough to prevent the peanuts from passing therebetween.

2. Apparatus as defined in claim 1 in which a baffle is mounted on the frame adjacent the discharge end of said conveyor trough and above the discs adjacent the end of said trough for deflecting all of the peanuts and the soil adhering thereto onto said adjacent discs.

JAMES A. ANDERSON.

REFERENCES CITED

The following references are of record in the file of this patent:

UNITED STATES PATENTS

| Number | Name | Date |
|---|---|---|
| 315,793 | Johnson | Apr. 14, 1885 |
| 622,035 | Bray | Mar. 28, 1899 |
| 1,014,493 | Lauritzen et al. | Jan. 9, 1912 |
| 1,177,995 | Crozier | Apr. 4, 1916 |
| 1,301,109 | Davis | Apr. 22, 1919 |
| 1,816,999 | Ensminger | Aug. 4, 1931 |
| 2,054,984 | Kohler | Sept. 22, 1936 |
| 2,257,352 | Silver | Sept. 30, 1941 |
| 2,311,982 | Goodrich | Feb. 23, 1943 |